United States Patent [19]

Malobicky, Jr. et al.

[11] 3,899,241

[45] Aug. 12, 1975

[54] VISUAL DISPLAY WINDSHIELD

[75] Inventors: Rudolph L. Malobicky, Jr., New Kensington, Pa.; James B. Perkins, Huntsville; Robert H. Taylor, New Market, both of Ala.

[73] Assignee: PPG Industries, Inc., Pittsburgh, Pa.

[22] Filed: Dec. 11, 1973

[21] Appl. No.: 423,840

[52] U.S. Cl. .................. 350/174; 350/171; 353/14
[51] Int. Cl. ............................................. G02b 27/14
[58] Field of Search ............ 350/174, 171; 356/251, 356/252; 353/14; 117/35 V

[56] References Cited
UNITED STATES PATENTS

| | | | |
|---|---|---|---|
| 1,871,877 | 8/1932 | Buckman | 350/174 |
| 2,264,044 | 11/1941 | Lee | 350/113 X |
| 2,641,159 | 6/1953 | Mihalakis | 353/14 |
| 2,750,833 | 6/1956 | Gross | 356/251 |
| 3,078,693 | 2/1963 | Lytle | 350/1 X |
| 3,276,813 | 10/1966 | Shaw | 116/116 X |
| 3,446,916 | 5/1969 | Abel et al. | 350/174 X |
| 3,506,556 | 4/1970 | Gillery et al. | 117/201 X |

*Primary Examiner*—David H. Rubin
*Attorney, Agent, or Firm*—Dennis G. Millman

[57] ABSTRACT

A windshield adapted for use in aircraft is provided with a transparent reflective coating on the inboard surface in the center portion of the forward vision area to form a visual image receiving area.

4 Claims, 3 Drawing Figures

3,899,241

VISUAL DISPLAY WINDSHIELD

BACKGROUND OF THE INVENTION

This invention relates to a windshield, more particularly to an aircraft windshield having a reflective coating on a portion thereof so that a pilot may project flight or target information onto the windshield so as to simultaneously view the information as well as the ground or target in the same viewing area.

The projection of information into the vision area on an aircraft cockpit is not in itself new, aviators having long recognized the contribution such a system can make to safety and flight accuracy. The normal placement of instruments in a cockpit requires the pilot to divert his eyes from forward surveillance for a moment to read the instruments. The situation is worsened by the fact that each shift from exterior to interior viewing (or vice versa) requires an additional moment for the eyes to refocus. Providing the information in the same area as the pilot's normal forward vision permits constant surveillance of both the instrumentation and exterior references, as well as eliminating lost time due to focusing. Further advantages are obtained when flying in darkness, fog, or uniform clouds where the lack of a distant focal point tends to lessen a pilot's ability to quickly focus on a distant reference when one is encountered. This effect can be reduced with the projection of flight information into the forward vision area because the pilot is given the illusion of something more distant upon which to focus.

Until the present invention, these objects were achieved by providing the cockpit with a combiner plate, that is, a separate transparent sheet mounted between the pilot and the windshield, onto which the images were projected. This arrangement had several disadvantages which have now been overcome by the present invention. Since the use of the combiner plate means the inclusion of an additional sheet of glass, total light transmittance in the critical forward vision area was reduced. Because the combiner was located in the forward vision area, for which glass must meet very stringent optical standards, substantial extra expense was incurred. Furthermore, the location of a combiner in a crowded aircraft cockpit was often cumbersome, and the separate combiner plate tended to be subject to vibrations.

Various prior art approaches to this problem can be seen in the following U.S. Patents:

| | | |
|---|---|---|
| 1,871,877 | Buckman | August 16, 1932 |
| 2,264,044 | Lee | November 25, 1941 |
| 2,641,159 | Michalakis | June 9, 1953 |
| 3,276,813 | Shaw | October 4, 1966 |

Buckman shows a separate combiner plate as discussed above, but adapted for use in automobiles rather than aircraft. Lee projects an image directly onto the windshield, but relies on reflection from the glass surface itself, which does not provide very distinct images, particularly in daylight. Michalakis, on the other hand, utilizes an opaque reflector fastened to the windshield, which has the serious drawback of obstructing forward vision. Shaw places a transparent coating on a windshield, but teaches away from coating the central forward vision area and thus does not deal with limitations on transmittance and optical regularity that accompany coating the central vision area.

In accordance with the present invention, the need for a combiner plate is eliminated by using a forward windshield which comprises a precision optical window incorporating a visual display screen. The inboard surface of the central vision portion of the forward windshield is given a reflective coating deposited by cathodic sputtering, thereby forming a screen for projecting flight and/or target information directly onto the windshield.

The invention will be understood more clearly in the light of the following detailed description and the accompanying drawings in which.

Figure 1:
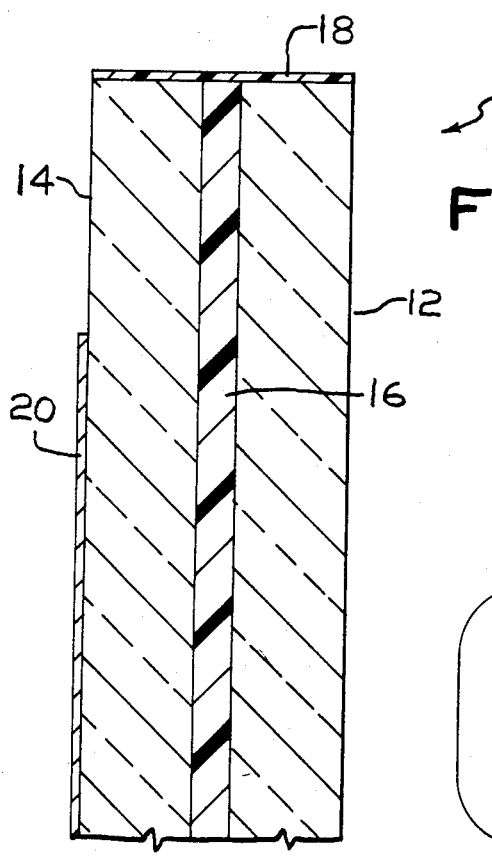
FIG. 1 is a cross-sectional view of a typical aircraft windshield.

The invention is applicable to any known type of aircraft windshield, the structure of the uncoated windshield itself forming no part of the present invention. Shown in FIG. 1 is a cross-section of a typical laminated aircraft windshield 10 having a plurality of flat glass plies 12 and 14 wherein 12 is the outboard ply and 14 is the inboard ply. Interposed between the sheets of glass is thermoplastic interlayer 16 which bonds the glass plies together. The edges may be sealed with elastic bonding material 18. Usually outboard ply 12 will have on its protected surface an essentially transparent electro-conductive film as part of an electrical heating circuit. Further constructional details of a typical aircraft windshield may be found in U.S. Pat. No. 3,356,833 granted to Dee R. Orcutt, the disclosure of which is incorporated herein by reference.

In accordance with this invention, a transparent reflective coating 20 (shown greatly exaggerated in FIG. 1) is deposited on a portion of the inboard surface of the windshield. Transmittance and reflectivity requirements are reconciled by placing the coating on the exposed inboard surface in order to obtain sufficient reflectance without using a thickness that would unduly sacrifice visible light transmittance. Additionally, it was found necessary that the coating material have an index of refraction of about 2.0 or greater in order to get both satisfactory reflectance and transmission. Placing the coating on the exposed surface, however, imposes the additional requirement that the coatings used be relatively durable, at least to the extent that they can withstand normal cleaning operations and light abrasions. An additional problem is the usual requirement that finished windshields of this type meet very high standards of optical regularity. As a result, pyrolytic methods of coating cannot be used on aircraft windshields due to the irregularities produced in the lamination by the high temperatures involved which can soften the plastic interlayer material. And, of course, the coating must be more reflective than the glass surface itself.

It has now been found that certain metal oxide coatings, characterized by their ability to be deposited by cathode sputtering, are capable of being utilized so as to meet the above-cited requirements for reflectivity, transmittance and durability. One coating of this type found to be particularly effective is sputtered from a cathode of indium with a minor amount of tin as a dopant so as to produce a coating of indium oxide. Although details of the sputtering technique itself may vary, one suitable method is disclosed in U.S. Pat. No. 3,506,556 granted to F. H. Gillery et al, which disclosure is incorporated herein by reference. These coatings are commonly applied to windshields as de-icer elements because of their electro-conductive properties. But in such applications, the coating would not be found on an inner ply nor on an exposed surface as is the case here. Sputtered tin oxide coating as taught by the Gillery et al. patent can also be used with the present invention. The metal oxides are favored because of their durability, but any relatively durable coating material which can be sputtered and which has a refractive index of about 2.0 or greater may be used.

The coating is applied to the portion of the windshield intended to receive the visual display while the resulting reflectivity is monitored. Generally, the highest reflectivity possible is desired, but in order to maintain transmittance above a practical minimum, it has usually been found necessary to limit the reflectivity of the coated area to less than about 25 percent when viewed at the installed angle of 60° from normal to the plane of the glass. The precise limits will depend upon the particular transmittance requirement, but a specific example that has been found suitable when using an indium oxide coating provided 62% transmittance normal to the plane of the windshield assembly and 22 ± 2% reflection at 60° from normal in the coated area. Transmittance in the uncoated portion was 76.4% normal to the plane of the windshield. For most aircraft installations, transmittance is required to be about 60% or greater.

Figure 2:
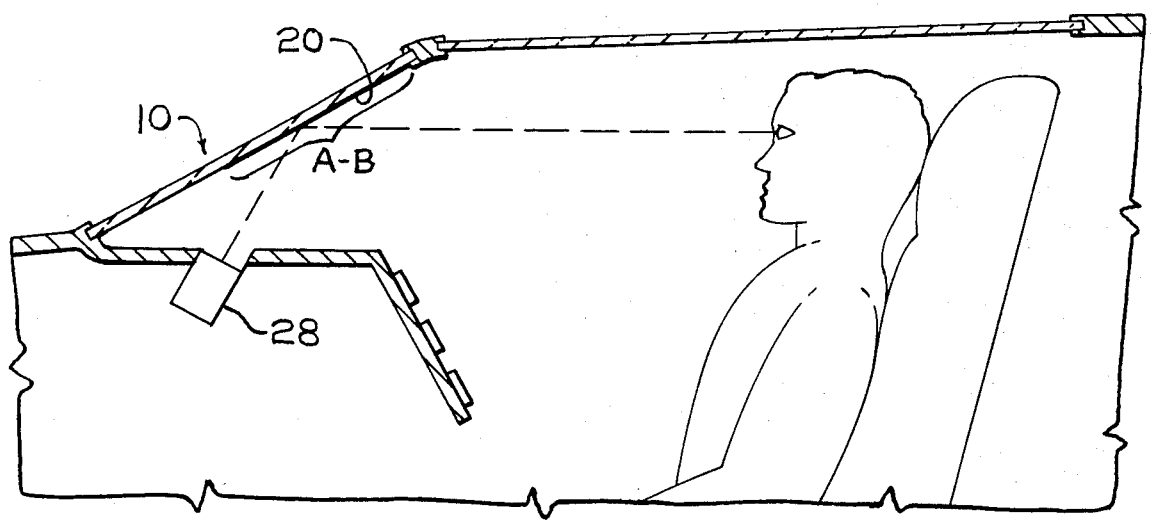
FIG. 2 is a schematic cross-sectional view of an aircraft cockpit incorporating the invention.
Figure 3:
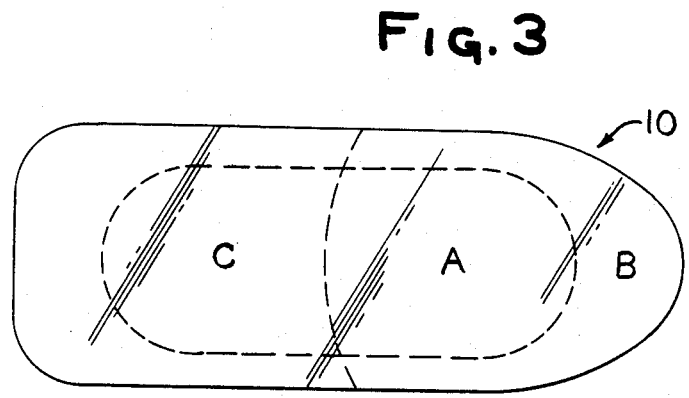
FIG. 3 is a plan view of a coated windshield.

FIG. 3 shows a top view of a typical aircraft windshield 10, wherein areas A and B in the upper part of the windshield (essentially the upper half) are the coated portion. Areas A and C are the areas for which optical regularity requirements are critical. Such an arrangement when installed as shown in FIG. 2, places the coated area A–B directly before the pilot's line of forward vision. Projector 28 is located below the windshield and is aimed at coated area A–B so that the projected images are visible to the pilot as he looks forward through area A–B. The displayed images may represent any number of flight condition parameters. A more detailed review of the types of images adaptable to such a system can be found in *Aviation Week and Space Technology*, Mar. 6, 1972, pages 53–55.

Flight information which can be provided in the visual display include altitude and azimuth information, flight director commands, speed commands, radio altitude during approaches and localizer and glide-slope deviation.

Military aircraft may provide for projection of target reticles or the like in addition to, or in place of, the flight data.

The invention has been described with particular reference to use in aircraft because the development of projection systems usable with the windshield of the present invention is quite advanced in that field. It should be apparent, however, that the windshield of the present invention could be used in any vehicle or other application where simultaneous viewing of the exterior and instruments is desired.

Although the specific embodiment of the invention has been set forth hereinabove, it should be apparent that the invention is not limited thereto, but includes the variations coming within the scope of the following claims.

What is claimed is:

1. An aircraft forward vision area windshield comprising:
    a flat lamination of a plurality of transparent plies having a central vision area provided with a high degree of optical regularity which is surrounded by marginal areas for which optical regularity is less critical; and
    a visual image receiving area on said lamination consisting of a transparent, reflective, cathodically sputtered, metal oxide coating having an index of refraction of at least about 2.0 on a substantial portion of the inboard surface of said central area, said visual image receiving area being at least 60% visible light transmissive normal to the plane of the windshield and having a reflectivity to visible light of less than about 25% from the inboard side at an angle of 60° from normal to the plane of the windshield.

2. The windshield of claim 1 wherein said coating consists essentially of indium oxide.

3. The windshield of claim 1 wherein said coating covers about one half of the inboard surface of said lamination.

4. The windshield of claim 1 wherein about one half of said central area is covered by said coating.

* * * * *